United States Patent
Nakamura

(10) Patent No.: US 12,218,564 B2
(45) Date of Patent: Feb. 4, 2025

(54) MOTOR

(71) Applicant: MINEBEA MITSUMI Inc., Nagano (JP)

(72) Inventor: Shintaro Nakamura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 230 days.

(21) Appl. No.: 17/934,219

(22) Filed: Sep. 22, 2022

(65) Prior Publication Data

US 2023/0108449 A1 Apr. 6, 2023

(30) Foreign Application Priority Data

Oct. 1, 2021 (JP) .................................. 2021-163007

(51) Int. Cl.
| | |
|---|---|
| H02K 7/08 | (2006.01) |
| H02K 1/16 | (2006.01) |
| H02K 1/2786 | (2022.01) |
| H02K 1/30 | (2006.01) |
| H02K 5/16 | (2006.01) |
| H02K 9/22 | (2006.01) |

(52) U.S. Cl.
CPC ................ H02K 7/08 (2013.01); H02K 1/16 (2013.01); H02K 9/227 (2021.01)

(58) Field of Classification Search
CPC ............ H02K 7/08; H02K 9/227; H02K 1/16; H02K 5/16; H02K 5/1677; H02K 5/1737; H02K 1/2789; H02K 1/2786; B64C 27/14
See application file for complete search history.

(56) References Cited

U.S. PATENT DOCUMENTS

| | | | | |
|---|---|---|---|---|
| 6,836,036 | B2 * | 12/2004 | Dube ................... | H02K 1/148 310/67 R |
| 8,022,583 | B2 * | 9/2011 | Zhang .................... | H02K 1/30 310/179 |
| 9,472,991 | B2 * | 10/2016 | Origlia ................ | H02K 1/2791 |
| 9,985,498 | B2 * | 5/2018 | Ballauf .................... | H02K 7/08 |
| 2019/0103781 | A1 * | 4/2019 | Imaizumi ............ | H02K 1/2791 |
| 2021/0167658 | A1 * | 6/2021 | Hanaoka .............. | H02K 1/2791 |
| 2022/0271607 | A1 * | 8/2022 | Kwak .................. | H02K 5/1735 |

FOREIGN PATENT DOCUMENTS

| | | | | |
|---|---|---|---|---|
| CN | 107834750 A | * | 3/2018 | .............. H02K 5/20 |
| EP | 3 605 802 A1 | | 2/2020 | |
| JP | 2019-068604 A | | 4/2019 | |

OTHER PUBLICATIONS

Extended European Search Report dated Mar. 1, 2023 for corresponding European Application No. 22198563.3.

* cited by examiner

*Primary Examiner* — Burton S Mullins

(74) *Attorney, Agent, or Firm* — Chrisman Gallo Tochtrop LLC

(57) ABSTRACT

A motor includes a rotor, a stator opposing the rotor, bearings configured to rotatably support the rotor, a blade attached to one side in an axis (X) direction of the rotor, and a holding part configured to hold the bearings. The holding part includes an attachment part to be attached with an external device and a contact part to be in contact with the stator. An end surface at one side in the axis (X) direction of the attachment part is arranged at the other side in the axis (X) direction relative to an end surface at the other side in the axis (X) direction of the contact part.

5 Claims, 7 Drawing Sheets

MOTOR

CROSS-REFERENCE TO RELATED APPLICATIONS

This application claims the benefit of priority to Japanese Application No. JP2021-163007 filed on Oct. 1, 2021, the entire disclosure of which are hereby incorporated herein by reference.

TECHNICAL FIELD

The present invention relates to a motor.

BACKGROUND ART

A known motor has an opening formed at a base part and can cool the motor by using wind generated by the rotation of a propeller and passing through the opening at the base part (for example, see Patent Literature 1).

CITATION LIST

Patent Literature

Patent Literature 1: JP 2019-68604 A

SUMMARY OF INVENTION

Technical Problem

However, improving the cooling efficiency of the motor to suppress the heat generation of the motor is awaited.

The present invention has been contrived in view of the above situation and provides a motor capable of suppressing the heat generation.

Solution to Problem

The above problem is solved by the present invention described below. That is, a motor according to the present invention includes a rotor, a stator opposing the rotor, bearings configured to rotatably support the rotor, a blade attached to one side in an axial direction of the rotor, and a holding part configured to hold the bearings. The holding part includes an attachment part to be attached with an external device, and a contact part to be in contact with the stator. An end surface at one side in the axial direction of the attachment part is arranged at the other side in the axial direction relative to an end surface at the other side in the axial direction of the contact part.

DESCRIPTION OF EMBODIMENTS

Figure 1:
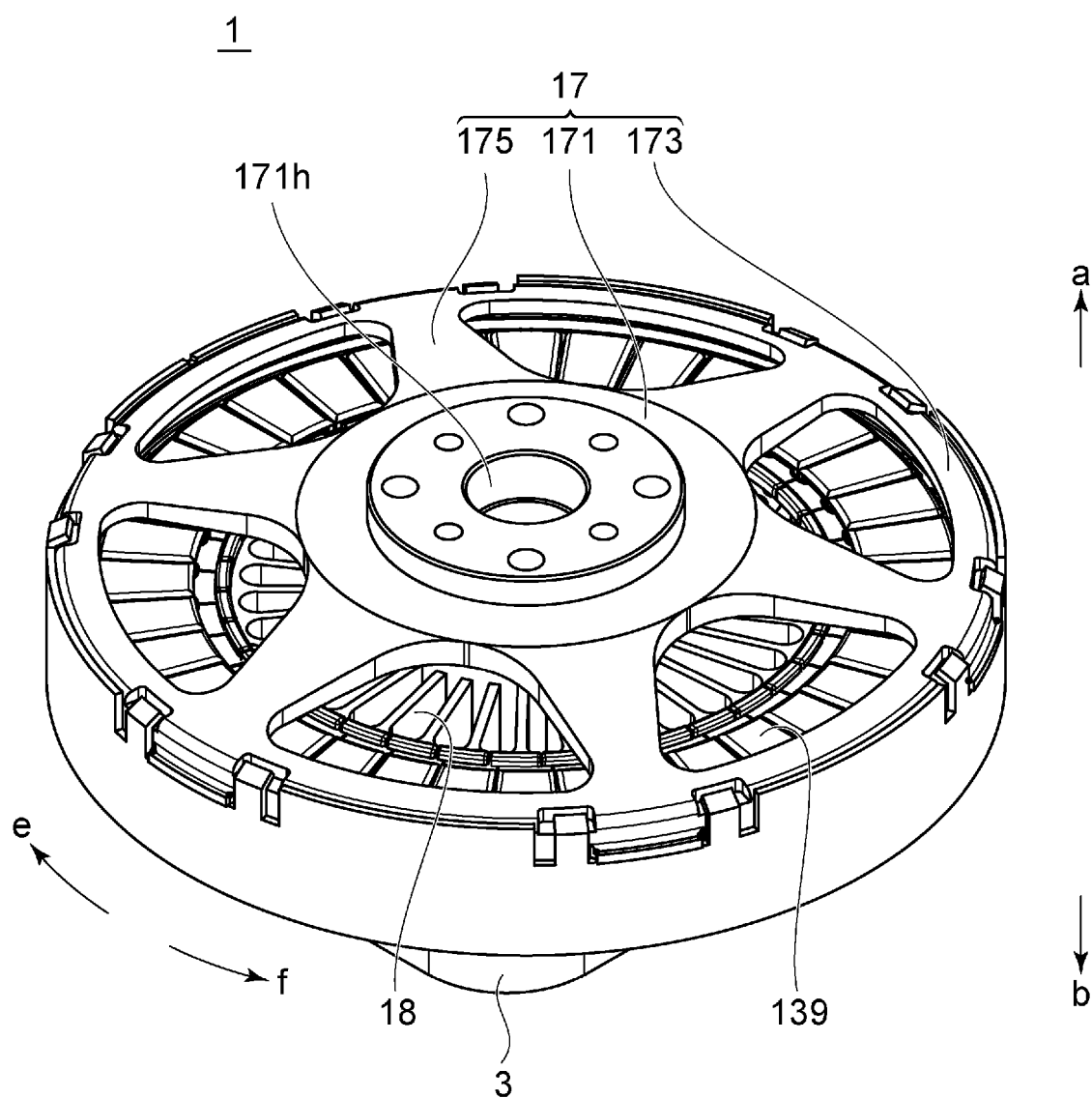
FIG. 1 is a perspective view from above illustrating an overall configuration of an outer rotor-type motor according to an embodiment of the present invention.
Figure 2:
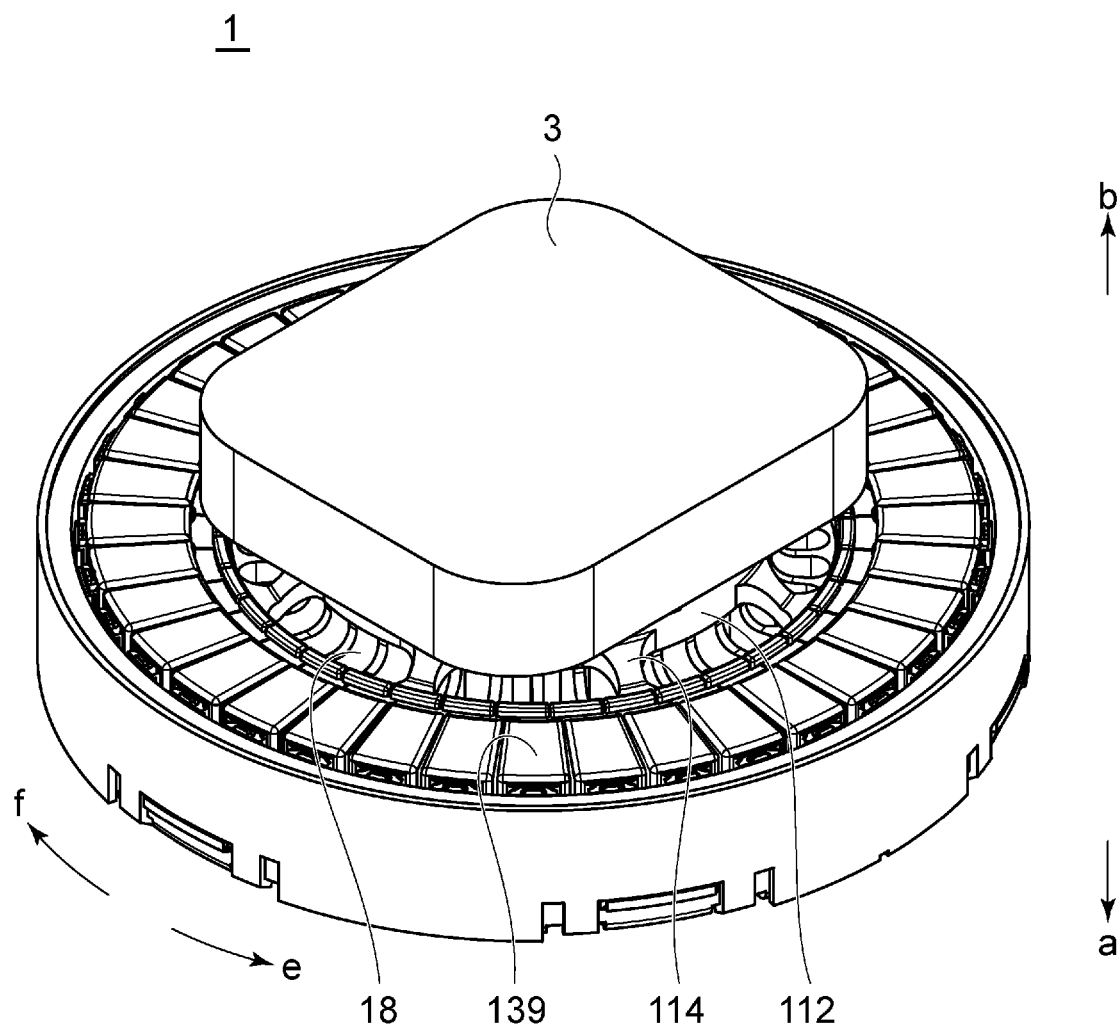
FIG. 2 is a perspective view from below illustrating an overall configuration of an outer rotor-type motor according to an embodiment of the present invention.
Figure 3:
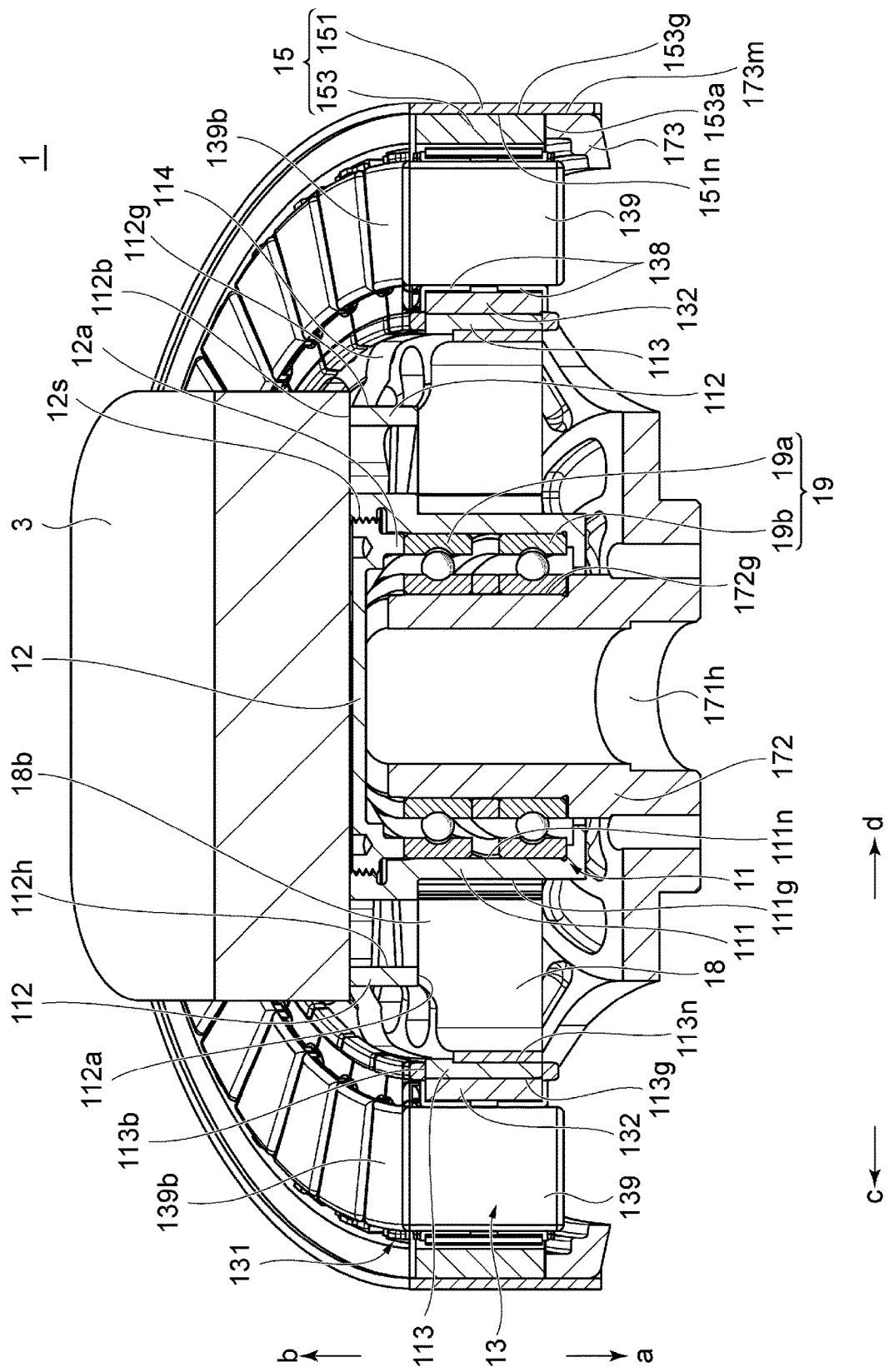
FIG. 3 is a perspective cross-sectional view of a motor according to an embodiment of the present invention.
Figure 4:
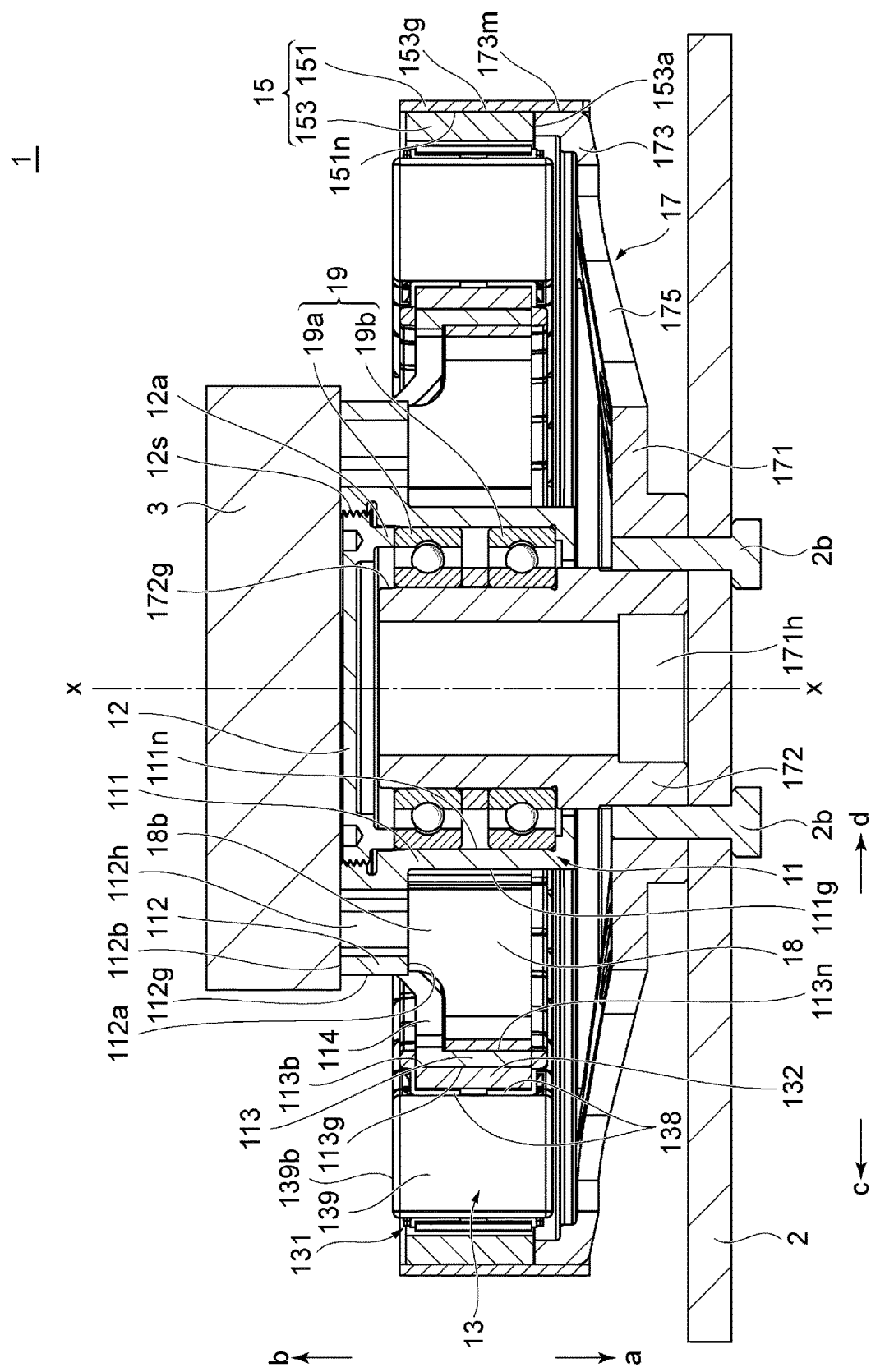
FIG. 4 is a cross-sectional view of a motor according to an embodiment of the present invention.
Figure 5:
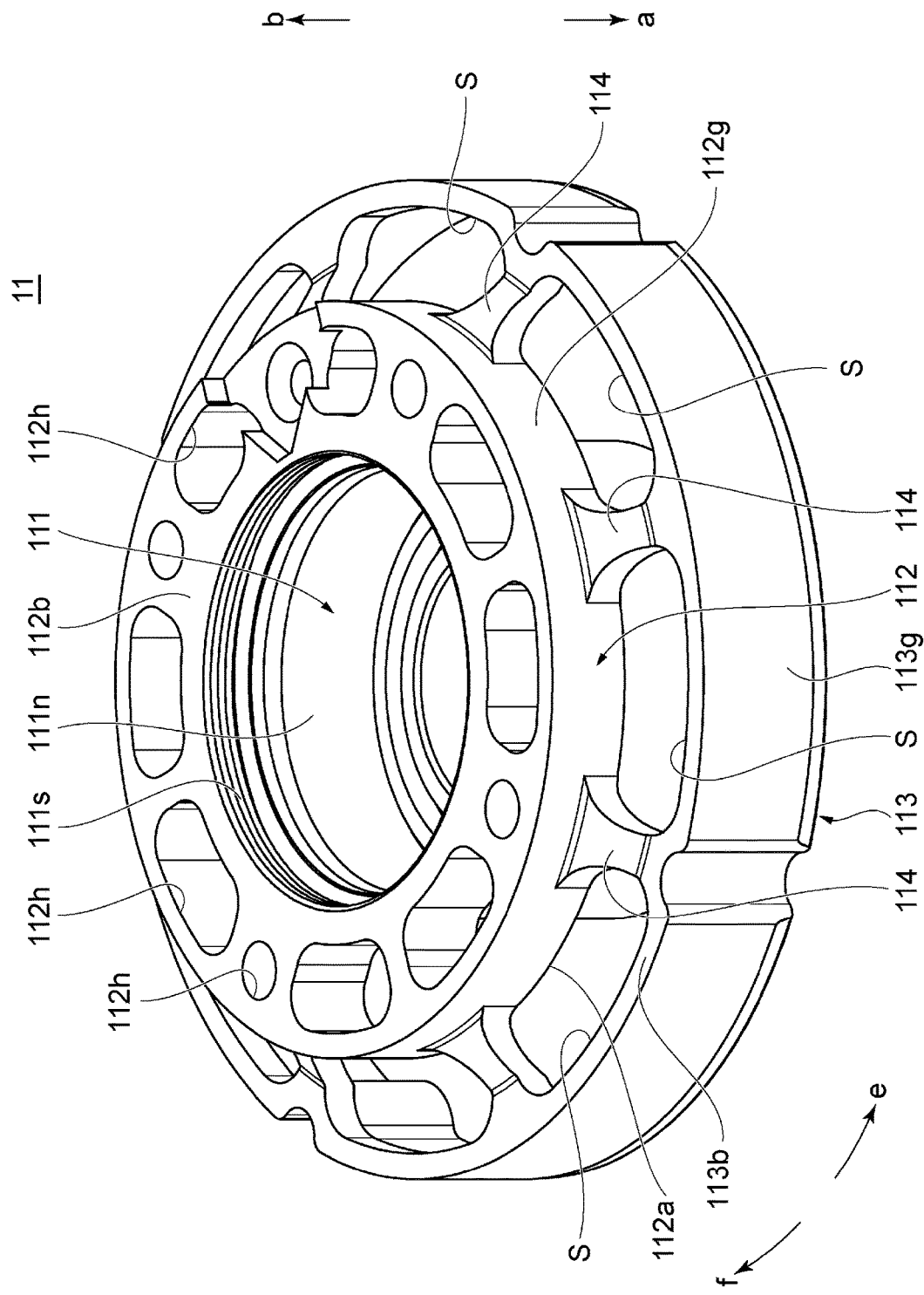
FIG. 5 is a perspective view illustrating a configuration of a holder of a motor according to an embodiment of the present invention.
Figure 6:
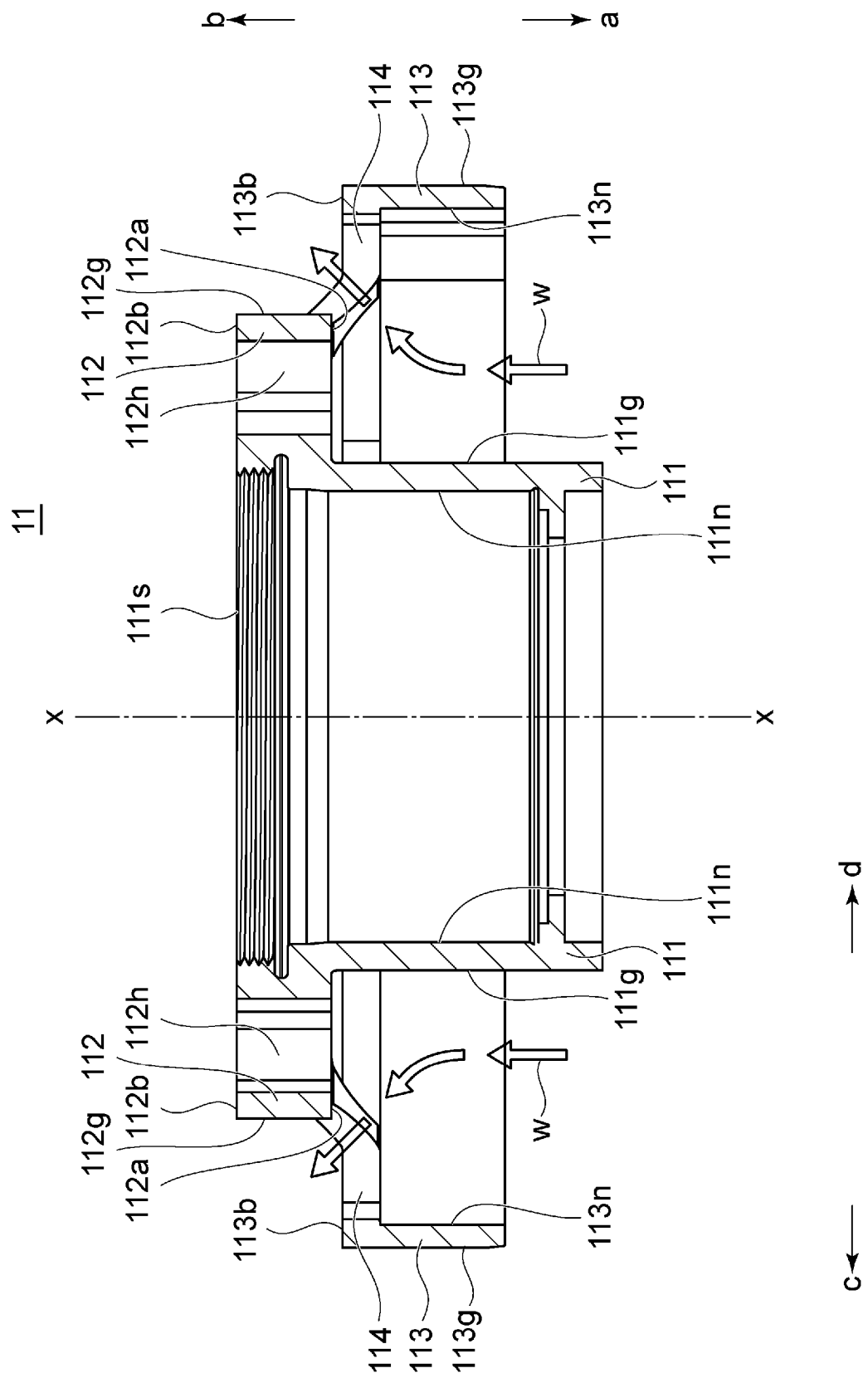
FIG. 6 is a cross-sectional view illustrating a configuration of a holder of a motor according to an embodiment of the present invention.
Figure 7:
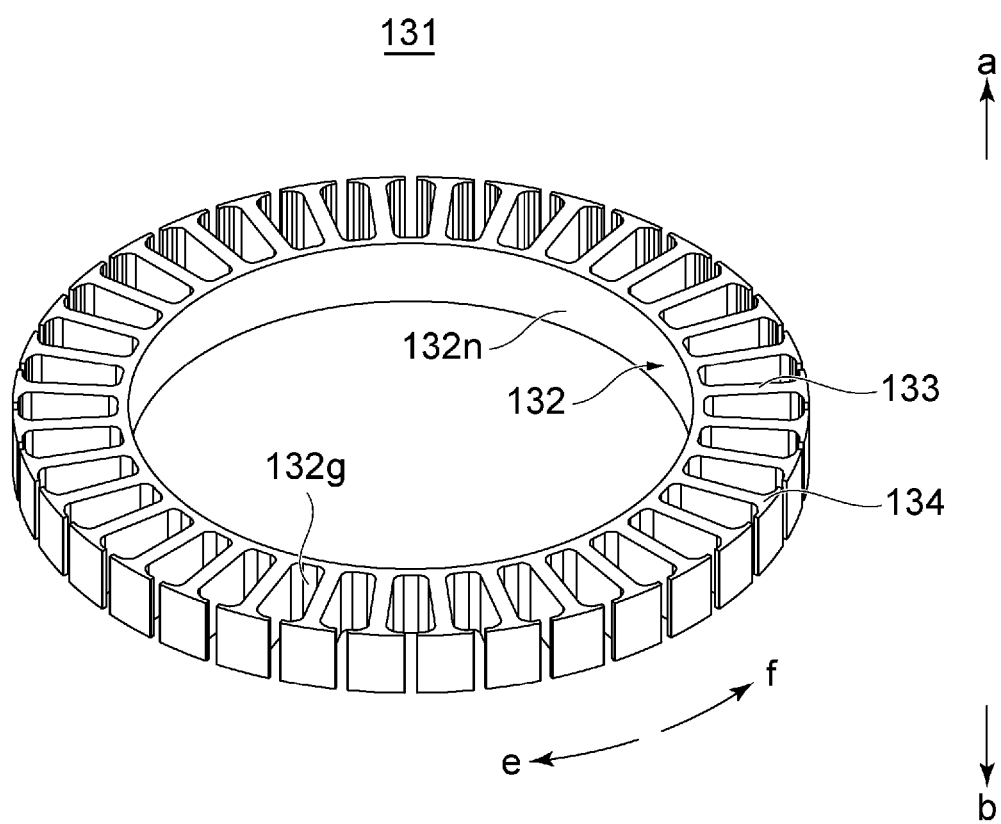
FIG. 7 is a perspective view illustrating a configuration of a stator core of a motor according to an embodiment of the present invention.

Embodiments of the present invention will be described with reference to the drawings. FIG. 1 is a perspective view from above illustrating an overall configuration of an outer rotor-type motor according to an embodiment of the present invention. FIG. 2 is a perspective view from below illustrating an overall configuration of an outer rotor-type motor according to an embodiment of the present invention. FIG. 3 is a perspective cross-sectional view of a motor according to an embodiment of the present invention. FIG. 4 is a cross-sectional view of a motor according to an embodiment of the present invention. FIG. 5 is a perspective view illustrating a configuration of a holder of a motor according to an embodiment of the present invention. FIG. 6 is a cross-sectional view illustrating a configuration of a holder of a motor according to an embodiment of the present invention. FIG. 7 is a perspective view illustrating a configuration of a stator core of a motor according to an embodiment of the present invention.

In the description of the present embodiment, for convenience, an extending direction of an axis X when a motor 1 rotates is referred to as an axial direction (rotational shaft direction) in the following description. Further, in the following description, for convenience, in the axial direction, an arrow a direction is referred to as an upper side or upward side, and an arrow b direction is referred to as a lower side or downward side. In a radial direction perpendicular to the axis X, an arrow c direction away from the axis X is referred to as an outer peripheral side or an outer side, and an arrow d direction approaching the axis X is referred to as an inner peripheral side or an inner side. In a circumferential direction of the motor 1 when viewed from the upper side, an arrow e direction is referred to as a clockwise direction, and an arrow f direction is referred to as a counterclockwise direction. In the following description, the upper side (the arrow a direction) and the lower side (the arrow b direction) mean an up-down relationship of the motor 1 in the drawings, and do not necessarily correspond to an up-down relationship in the gravitational direction.

As illustrated in FIGS. 1 to 7, the motor 1 is an outer rotor-type brushless motor to be mounted on a floating movable body, such as a drone (not illustrated), for example.

As illustrated in FIGS. 1 to 4, the motor 1 includes a propeller (blade) 2 of a drone (see FIG. 4) attached to a rotor housing 17 at the upper side (the arrow a direction) and an aircraft body (external device) 3 of the drone attached to a holder 11 at the lower side (the arrow b direction). As illustrated in FIGS. 3 and 4, the motor 1 mainly includes the holder 11, a stator 13, a rotor 15, the rotor housing 17, a heat sink 18, and bearings 19.

The holder 11 is a member made of, for example, a nonmagnetic material such as aluminum, and holding the stator 13 and the bearings 19. That is, the holder 11 functions as a holding part. As illustrated in FIGS. 3 to 6, the holder 11 is a tubular member formed in a circular shape in a plan view. The holder 11 includes an inner wall part (first wall part) 111, an attachment part 112, an outer wall part (second wall part) 113, and a connection part 114.

The inner wall part 111 is formed at the inner peripheral side (the arrow d direction) of the holder 11 in the radial direction. The inner wall part 111 is formed in an overall cylindrical shape or substantially cylindrical shape extending in the axis X direction. The inner wall part 111 holds two bearings 19 (19a, 19b) on a surface 111n at the inner peripheral side (the arrow d direction) (hereinafter, this surface is referred to as "inner peripheral surface").

The two bearings 19 (19a, 19b) rotatably hold the rotor 15. The two bearings 19 (19a, 19b) are fitted into the inner peripheral surface 111n of the inner wall part 111 and fixed to the inner wall part 111 with an adhesive or the like. The means for fixing the two bearings 19 is not limited to the fitting and the adhesive, and outer rings of the bearings 19 may be press-fitted into and fixed to the inner peripheral surface 111n of the inner wall part 111.

In other words, the inner wall part 111 functions as a bearing holder (bearing holding part) holding the two bearings 19. The bearings 19 are ball bearings, for example. However, the bearings 19 are not limited to the ball bearings, and any other various bearings such as a sleeve bearing may be used.

An end part at the lower side (the arrow b direction) of the inner peripheral surface 111n of the inner wall part 111 has a larger inner diameter than inner diameters of other parts and includes a female screw groove 111s.

An end part of the inner wall part 111 of the holder 11 at the opposite side to the rotor housing 17 (the lower side (the arrow b direction)) includes a pusher 12 formed in a thin-plate disk shape and fixed. The pusher 12 has a function to apply a preload to the bearings 19.

The pusher 12 is fixed to the inner wall part 111 with an adhesive or the like with a surface at the outer peripheral side (the arrow c direction) in the radial direction (hereinafter, this surface is referred to as "outer peripheral surface") screwed into the inner peripheral surface 111n of the inner wall part 111. For example, a screw groove (male screw groove) 12s is formed in a surface at the outer peripheral side (the arrow c direction) of the pusher 12 in the radial direction, and the screw groove 12s is screwed into the female screw groove 111s formed in the inner peripheral surface 111n of the inner wall part 111. The pusher 12 includes a stepped part 12a at an end part at the outer peripheral side in the radial direction. The stepped part 12a supports the bearing 19a from the lower side (the arrow b direction).

The attachment part 112 is a part to be attached with the aircraft body (external device) 3 of the drone. The attachment part 112 is provided at an end part at the lower side (the arrow b direction) of the inner wall part 111. The attachment part 112 is formed continuously at the inner wall part 111 and is integrally formed with the inner wall part 111. More specifically, the attachment part 112 is a part with the outer diameter of the end part at the lower side (the arrow b direction) of the inner wall part 111 enlarged toward the outer peripheral side (the arrow c direction). As illustrated in FIGS. 5 and 6, the attachment part 112 is formed in an annular shape when viewed in a plan view. A plurality of holes 112h is formed extending along the axis X in the attachment part 112. The hole 112h is a hole for the passage of a fastener of a wiring line when the aircraft body 3 is attached, wind generated by the propeller 2, and the like. The attachment part 112 is formed in such a size that a surface opposing the aircraft body 3 is covered by the aircraft body 3. The attachment part 112 is formed with a predetermined height. Specifically, the attachment part 112 is formed extending in the axis X direction.

The outer wall part 113 is formed at the outer peripheral side (the arrow c direction) of the holder 11 in the radial direction. The outer wall part 113 is formed in an overall cylindrical shape or substantially cylindrical shape extending in the axis X direction. The outer wall part 113 is formed continuously at the connection part 114 and is integrally formed with the connection part 114. The outer wall part 113 holds the stator 13 on a surface 113g at the outer peripheral side (the arrow c direction) (hereinafter, this surface is referred to as "outer peripheral surface"). The connection part 114 may be constituted separately from the outer wall part 113 and the attachment part 112 and may be integrally formed with the outer wall part 113 and the attachment part 112 by using a fastening member or the like.

The stator 13 is fitted into the outer peripheral surface 113g of the outer wall part 113 and is fixed to the outer wall part 113 with an adhesive or the like. The means for fixing the stator 13 is not limited to the fitting and the adhesive, and the stator 13 may be press-fitted into and fixed to the outer peripheral surface 113g of the outer wall part 113. That is, the outer wall part 113 functions as a contact part to be in contact with the stator 13.

The outer diameter of the outer wall part 113 (the outer peripheral surface 113g) is approximately the same as an inner diameter of an inner peripheral surface 132n (FIG. 7) of an annular part 132 of a stator core 131 described below. However, the outer diameter of the outer wall part 113 (the outer peripheral surface 113g) is not limited to the above configuration and may be slightly smaller than or slightly larger than the inner diameter of the inner peripheral surface 132n of the annular part 132.

The outer wall part 113 has a function to hold the stator core 131, and a stator holding part is formed by the outer wall part 113.

The outer wall part 113 is provided at the outer peripheral side (the arrow c direction) at a predetermined interval from the inner wall part 111. Similar to the inner wall part 111, the outer wall part 113 extends along the axis X direction.

An end surface 113b at the lower side in the axis X direction (the arrow b direction) of the outer wall part 113 is arranged at the upper side in the axis X direction (the arrow a direction) relative to an end surface 112a at the upper side in the axis X direction (the arrow a direction) of the attachment part 112. In other words, the end surface 112a at one side in the axis X direction (the arrow a direction) of the attachment part 112 is arranged at the other side in the axis X direction (the arrow b direction) relative to the end surface 113b at the other side in the axis X direction (the arrow b direction) of the outer wall part 113. Thus, a space including neither the attachment part 112 nor the outer wall part 113 along the axis X direction is formed between the end surface 112a at the upper side in the axis X direction (the arrow a direction) of the attachment part 112 and the end surface 113b at the lower side in the axis X direction (the arrow b direction) of the outer wall part 113.

The outer wall part 113 is formed with a larger outer diameter and inner diameter than the outer diameters and inner diameters of the inner wall part 111 and the attachment part 112. Specifically, the inner diameter of the outer wall part 113 is formed to be larger than the outer diameters of the inner wall part 111 and the attachment part 112, and when the holder 11 is viewed in a plan view, a space is formed between an outer peripheral surface 111g of the inner wall part 111 and an outer peripheral surface 112g of the attachment part 112, and an inner peripheral surface 113n of the outer wall part 113.

When the stator 13 is attached to the holder 11, the end surface 113*b* at the lower side in the axis X direction (the arrow b direction) of the outer wall part 113 is arranged at the upper side in the axis X direction (the arrow a direction) relative to an end surface 139*b* at the lower side in the axis X direction (the arrow b direction) of a coil 139. In other words, the end surface 139*b* at the other side in the axis X direction (the arrow b direction) of the coil 139 is arranged at the other side in the axis X direction (the arrow b direction) relative to the end surface 113*b* at the other side in the axis X direction (the arrow b direction) of the outer wall part 113.

The connection part 114 is formed extending from the vicinity of the end part at the upper side in the axis X direction (the arrow a direction) of the outer peripheral surface 112*g* of the attachment part 112 toward the vicinity of the end part at the lower side in the axis X direction (the arrow b direction) of the inner peripheral surface 113*n* of the outer wall part 113. In other words, the connection part 114 is a part connecting the attachment part 112 and the outer wall part 113 and extends inclined toward the inner side in the radial direction relative to the axis X direction. Specifically, the connection part 114 intersects with the extending direction of the attachment part 112 and the outer wall part 113 (the axis X direction) and extends in an oblique direction approaching the inner peripheral side (the arrow d direction) toward the lower side in the axis X direction (the arrow b direction). Thus, as illustrated in FIG. 5, a step in the axis X direction is provided between an end surface 112*b* at the lower side in the axis X direction (the arrow b direction) of the attachment part 112 and the end surface 113*b* at the lower side in the axis X direction (the arrow b direction) of the outer wall part 113.

The connection part 114 is integrally formed with the attachment part 112 with one end part (the end part at the lower side (the arrow b direction)) formed continuously at the attachment part 112. The connection part 114 is integrally formed with the outer wall part 113 with the other end part (the end part at the upper side (the arrow a direction)) being formed continuously at the outer wall part 113.

A plurality of the connection parts 114 is provided at predetermined intervals along the circumferential direction of the attachment part 112 and the outer wall part 113. Accordingly, an opening S is formed between the adjacent connection parts 114.

The heat sink (cooling part) 18 is provided between the inner wall part 111 and the outer wall part 113. The heat sink 18 is provided at a position opposing the stator 13 in the radial direction.

The heat sink 18 is formed in a plate shape and has a function to dissipate the heat in the motor 1. The heat sink 18 is provided at a position opposing the stator 13 via the outer wall part 113 in the radial direction.

As for the length of the heat sink 18 along the axis X direction, a part at the outer peripheral side is formed shorter than the outer wall part 113, but a part at the inner peripheral side is formed longer than the outer wall part 113. In this case, the part at the inner peripheral side of the heat sink 18 refers to a part opposing the attachment part 112 in the axis X direction. That is, part of the heat sink 18 includes a projecting part 18*b* projecting toward the lower side in the axis X direction (the arrow b direction), and the projecting part 18*b* opposes the attachment part 112.

A plurality of the heat sinks 18 is provided at predetermined intervals along the circumferential direction of the inner wall part 111 and the outer wall part 113. Accordingly, a space is formed between the adjacent heat sinks 18. The shape of the heat sink 18 may be a rectangular shape where the lengths of a part at the outer peripheral side and a part at the inner peripheral side are equal or may be a shape having a part at the outer peripheral side shorter than a part at the inner peripheral side. It is sufficient to have a shape making contact with wind W passing through the interior of the motor 1.

The stator 13 is fixed to the outer peripheral surface 113*g* of the outer wall part 113 of the holder 11. The stator 13 is provided at a position opposing the rotor 15, as illustrated in FIGS. 3 and 4. The stator 13 includes the stator core 131 and the coil 139. As illustrated in FIG. 7, the stator core 131 is a stacked body of silicon steel sheets or the like as a magnetic body.

The stator core 131 includes the annular part 132, a tooth part 133, and a leading end part 134. A part including the tooth part 133 and the leading end part 134 is referred to as a magnetic pole part.

The annular part 132 is an annular body formed in a circular shape in a plan view. The annular part 132 is formed with a predetermined thickness in the radial direction.

The inner peripheral surface 132*n* (a side end surface at the inner diameter side of the stator 13 in the radial direction) of the annular part 132 is a part making contact with the outer peripheral surface 113*g* of the outer wall part 113 of the holder 11, and an outer peripheral surface 132*g* of the annular part 132 is a part with the tooth part 133 formed.

The tooth part 133 is formed at the outer peripheral surface 132*g* of the annular part 132. The tooth part 133 is integrally formed with the annular part 132 in such a manner as to extend from the outer peripheral surface 132*g* of the annular part 132 toward the outer peripheral side (the side in the arrow c direction). That is, the tooth part 133 is formed extending along the radial direction of the annular part 132. A plurality of the tooth parts 133 is formed at a given interval along the circumferential direction of the outer peripheral surface 132*g* of the annular part 132.

The leading end part 134 is formed at the leading end of each of the tooth parts 133. The leading end part 134 is integrally formed with the tooth part 133 projecting from the leading end of the tooth part 133 in the clockwise direction (the side in the arrow "e" direction) and in the counterclockwise direction (the side in the arrow "f" direction) of the annular part 132 in the circumferential direction. The leading end parts 134 are formed at a given interval in such a manner that the adjacent leading end parts 134 are not in contact with each other. The interval between the adjacent leading end parts 134 is narrower than a gap (slot) between the adjacent tooth parts 133.

An insulator 138 (see FIG. 4) formed of an insulating member is mounted at the annular part 132 and the tooth part 133 of the stator core 131, and the coil 139 is wound via the insulator 138. That is, the annular part 132 and the tooth part 133 of the stator core 131 are electrically insulated from the coil 139 via the insulator 138. A resin film having an insulating property may be formed or applied on a surface of the stator core 131, and the resin film may be used as the insulator.

As illustrated in FIGS. 3 and 4, the rotor 15 is formed in an annular shape. The rotor 15 includes a yoke 151 and a magnet 153.

The yoke 151 is an iron core having a cylindrical shape extending along the axis X. The yoke 151 integrally holds the magnet 153 while surrounding the magnet 153. The yoke 151 forms the magnet 153 and a magnetic circuit and is formed of a magnetic body such as iron. The yoke 151 is formed higher in position than the magnet 153 in the axis X direction.

The magnet 153 is an integrally molded product of a magnetic body. The magnet 153, similar to the yoke 151, has a cylindrical shape extending along the axis X. The magnet 153 is fixed to an inner peripheral surface 151*n* of the yoke 151 by using an adhesive. However, the magnet 153 may be held in contact with the inner peripheral surface 151*n* of the yoke 151 by not only the adhesive but also press-fitting, for example.

An inner peripheral surface of the magnet 153 opposing the leading end part 134 of the stator core 131 is divided into a region magnetized to the south pole and a region magnetized to the north pole, and these magnetized regions are alternately arranged along the circumferential direction. The height of the magnet 153 in the axis X direction is formed lower than the height of the yoke 151 in the axis X direction. The height of the magnet 153 in the axis X direction may be formed equal to the height of the yoke 151 in the axis X direction.

In other words, it is sufficient for the magnet 153 to be held with an outer peripheral surface 153*g* of the magnet 153 covered by the yoke 151 from the outer peripheral side (the side in the arrow c direction). An outer peripheral part 173 (described below) of the rotor housing 17 is held by the inner peripheral surface 151*n* of the yoke 151 and an end surface 153*a* at the upper side (the arrow a direction) of the magnet 153.

The rotor housing 17 is formed of a relatively light metal such as an aluminum alloy and has a disk shape on the whole. However, without being limited to the aluminum alloy, the rotor housing 17 may be formed of other materials such as resin and plastic. As illustrated in FIGS. 1, 3, and 4, the rotor housing 17 includes an inner peripheral part 171, the outer peripheral part 173, and a spoke part 175.

As illustrated in FIGS. 3 and 4, the inner peripheral part 171 is formed at the inner peripheral side (the arrow c direction) of the rotor housing 17. The inner peripheral part 171 is formed in a disk shape, and a hole 171*h* about the axis X is formed at the center. The inner peripheral part 171 has an outer diameter capable of covering the inner wall part 111 of the holder 11 from the upper side (the arrow a direction).

The inner peripheral part 171 includes a rotational shaft 172 formed in a cylindrical shape extending in an up-down direction (the arrow a and b directions) about the axis X. Inner rings of the bearings 19 (19*a*, 19*b*) are held on an outer peripheral surface 172*g* of the rotational shaft 172. That is, the rotational shaft 172 rotates along with the rotor 15 in the motor 1. The rotational shaft 172 may have a columnar shape having no space at the inner peripheral side. The propeller 2 is attached to the rotational shaft 172 with bolts 2*b*. That is, the propeller 2 rotates along with the rotational shaft 172 in the motor 1.

The outer peripheral part 173 is formed in an annular shape at the end part at the outer peripheral side (the arrow c direction) of the rotor housing 17. The outer peripheral part 173 is a part covering the magnet 153 fixed to the inner peripheral surface 151*n* of the yoke 151 from the upper side (the arrow a direction) by using the end part at the outer peripheral side (the arrow c direction) in the radial direction. The outer peripheral part 173 is pressure-fitted into the inner peripheral surface 151*n* of the yoke 151 to be integrally attached to the yoke 151, and an outer side surface 173*m* of the outer peripheral part 173 is in contact with the inner peripheral surface 151*n* of the yoke 151. The outer peripheral part 173 may be integrally attached to the yoke 151 by adhesion or the like to the inner peripheral surface 151*n* of the yoke 151.

A plurality (for example, six) of the spoke parts 175 is formed and connects the inner peripheral part 171 and the outer peripheral part 173. One end part of the spoke part 175 is connected to an edge part at the outer peripheral side (the arrow c direction) of the inner peripheral part 171, and the other end part is connected to an edge part at the inner peripheral side (the arrow d direction) of the outer peripheral part 173.

The inner peripheral part 171, the outer peripheral part 173, and the spoke part 175 are integrally formed.

In the configuration described above, the holder 11 is inserted into the stator core 131 in such a manner as to set the inner peripheral surface 132*n* of the annular part 132 of the stator core 131 to be along the outer peripheral surface 113*g* of the outer wall part 113 of the holder 11.

In this case, in advance, an adhesive is applied to the outer peripheral surface 113*g* of the outer wall part 113 of the holder 11. When the holder 11 is inserted into the stator core 131, the outer peripheral surface 113*g* of the outer wall part 113 of the holder 11 and the inner peripheral surface 132*n* of the annular part 132 of the stator core 131 are brought into close contact with each other, and then the adhesive is dried. As a result, the stator core 131 is fixed to the holder 11.

The pusher 12, the bearings 19, and the rotor housing 17 are attached to the inner wall part 111 of the holder 11.

This enables the motor 1 to be assembled.

According to the above configuration, with the drive of the motor 1, the propeller 2 attached to the rotor 15 also rotates about the axis X along with the rotational shaft 172. The wind W generated by the rotation of the propeller 2 (see FIG. 6) flows toward the lower side (the arrow b direction) of the motor 1. At this time, the wind W passes through the opening S between the attachment part 112 and the outer wall part 113 and attempts to pass through toward the lower side (the arrow b direction) of the motor 1. In this case, because the end surface 112*a* at the upper side in the axis X direction (the arrow a direction) of the attachment part 112 is arranged at the lower side in the axis X direction (the arrow b direction) relative to the end surface 113*b* at the lower side in the axis X direction (the arrow b direction) of the outer wall part 113, the flow of the wind in the motor 1 is such that the wind W attempts to go out through the opening S before colliding with the attachment part 112, as indicated by arrows in FIG. 6. That is, because the wind W reaches the opening S before reaching the end surface 112*a* at the upper side in the axis X direction (the arrow a direction) of the attachment part 112, the wind W easily passes through toward the lower side from the upper side of the motor 1 in such a manner as to prevent the collision with the aircraft body 3. This makes it possible to secure a sufficient flow rate and a sufficient flow volume. This enables the stay of the wind W within the motor 1 to be suppressed, and therefore the cooling efficiency of the motor 1 may be improved, and the heat generation of the motor 1 may be suppressed. Further, the efficiency of the motor 1 may be improved. In addition, it is possible to reduce a burn-out risk of the coil 139, and it is possible to enhance the cooling performance of the heat sink 18.

Because the connection part 114 is arranged being inclined toward the inner side in the radial direction relative to the axis X direction, it is possible to set a step in the axis X direction with the attachment part 112 and the outer wall part 113 as illustrated in FIG. 5, and this step may be used as the opening S. Because the outer wall part 113 is formed at the outer side relative to the attachment part 112, a space may be formed between the outer peripheral surface 112g of the attachment part 112 and the inner peripheral surface 113n of the outer wall part 113, and a passage of the wind W may be secured even when the aircraft body 3 covers the entire region of the attachment part 112. Accordingly, the cooling of the motor 1 by the wind W is unlikely to be affected by the size of the aircraft body 3.

Because the connection parts 114 are arranged at intervals between each other along the circumferential direction of the attachment part 112 and the outer wall part 113, it is possible to form many passages of the wind W.

Further, the end surface 139b at the other side in the axis X direction (the arrow b direction) of the coil 139 is arranged at the other side in the axis X direction (the arrow b direction) relative to the end surface 113b at the other side in the axis X direction (the arrow b direction) of the outer wall part 113, and therefore the wind W passing through the opening S is also likely to hit the coil 139 so as to improve the cooling efficiency of the coil 139.

Furthermore, the heat sink 18 opposes the stator 13 in the radial direction and opposes the attachment part 112 of the holder 11 in the axis X direction, and thus the heat sink 18 is arranged in the passage of the wind W. As a result, the heat of the heat sink 18 may be efficiently released to the outside by the wind W.

Because the heat sink 18 opposes the stator 13 via the outer wall part 113, the heat of the stator 13 may be easily absorbed.

Because the heat sink 18 includes the projecting part 18b projecting in the axis X direction, and the projecting part 18b opposes the attachment part 112 of the holder 11 in the axis X direction, the heat sink 18 may be increased in size as much as possible, and the cooling efficiency of the motor 1 may be improved.

Other Embodiments

In the above description, the motor is described with reference to the preferred embodiments, but the motor is not limited to the configurations of the embodiments described above.

For example, the above-described motor 1 is configured as an outer rotor-type brushless motor but is applicable also to a motor other than a brushless motor, and an inner rotor-type motor. Further, the outer peripheral surface 112g of the attachment part 112 may be set to be an inclined surface inclined toward the inner side in the radial direction (the arrow d direction), toward the upper side in the axis X direction (the arrow a direction). This allows for increasing the size of the opening S between the attachment part 112 and the outer wall part 113 and improving the cooling efficiency of the motor 1, enabling the heat generation of the motor 1 to be suppressed.

The inner peripheral surface 113n of the outer wall part 113 may be set to be an inclined surface inclined toward the outer side in the radial direction (the arrow c direction), toward the lower side in the axis X direction (the arrow b direction). This allows for increasing the size of the opening S between the attachment part 112 and the outer wall part 113 and improving the cooling efficiency of the motor 1, enabling the heat generation of the motor 1 to be suppressed. The inner wall part 111, the attachment part 112, the outer wall part 113, and the connection part 114 constituting the holder 11 may be integrally formed, or some of these parts may be separately formed. A disk-shaped rotor housing without the spoke part 175 may be used.

In addition, the motor according to the present invention may be appropriately modified by a person skilled in the art according to conventionally known knowledge. Such modifications are of course included in the scope of the present invention as long as these modifications still include the configurations of the present invention.

REFERENCE SIGNS LIST

1 Motor
2 Propeller
3 Aircraft body
11 Holder
12 Pusher
13 Stator
15 Rotor
17 Rotor housing
18 Heat sink
19 (19a, 19b) Bearing
111 Inner wall part
112 Attachment part
113 Outer wall part
114 Connection part
131 Stator core
132 Annular part
133 Tooth part
134 Leading end part
138 Insulator
139 Coil
151 Yoke
153 Magnet
171 Inner peripheral part
173 Outer peripheral part
175 Spoke part

The invention claimed is:

1. A motor, comprising:
a rotor;
a stator opposing the rotor;
bearings configured to rotatably support the rotor;
a blade attached to one side in an axial direction of the rotor; and
a holding part configured to hold the bearings,
the holding part including an attachment part to be attached with an external device and a contact part to be in contact with the stator,
wherein an end surface at one side in the axial direction of the attachment part is arranged at the other side in the axial direction relative to an end surface at the other side in the axial direction of the contact part,
the holding part includes a connection part connecting the attachment part and the contact part, and
the connection part is arranged inclined toward an inner side in a radial direction relative to the axial direction.

2. The motor according to claim 1,
wherein the stator includes a coil, and
an end surface at the other side in the axial direction of the coil is arranged at the other side in the axial direction relative to the end surface at the other side in the axial direction of the contact part.

3. The motor according to claim 1, further comprising:
a cooling part opposing the stator in the radial direction,
wherein the cooling part opposes the attachment part in the axial direction.

4. The motor according to claim 3,
wherein the cooling part opposes the stator via the holding part in the radial direction.

5. The motor according to claim 3,
wherein the cooling part includes a projecting part projecting in the axial direction, and the projecting part opposes the attachment part in the axial direction.

* * * * *